Jan. 15, 1952  C. E. HOMER  2,582,332
FLYING SAW
Filed Oct. 22, 1946
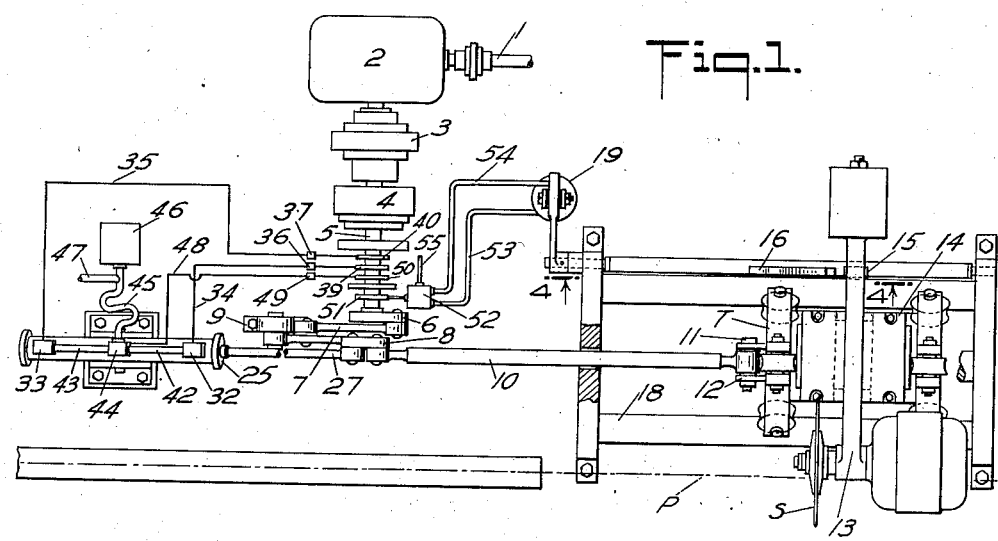
Fig. 1.
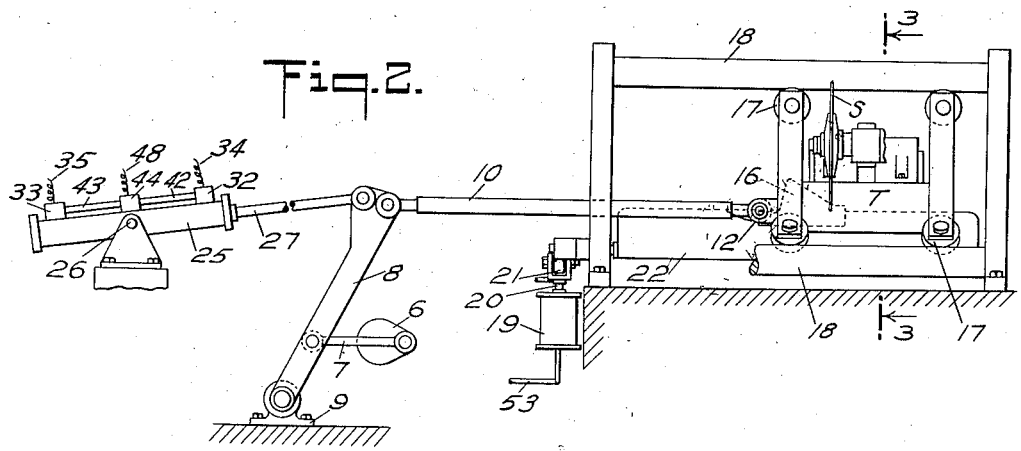
Fig. 2.
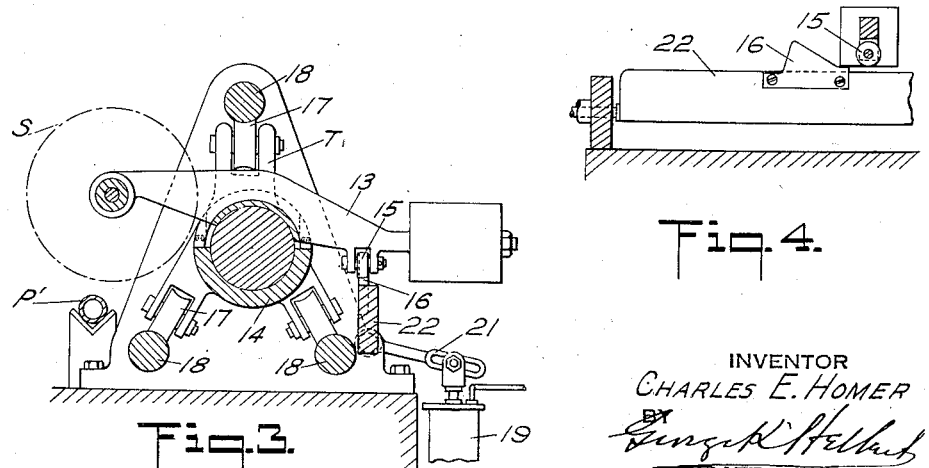
Fig. 3.
Fig. 4.
INVENTOR
CHARLES E. HOMER
ATTORNEY Patented Jan. 15, 1952

2,582,332

UNITED STATES PATENT OFFICE 2,582,332

FLYING SAW

Charles E. Homer, Highland, Ind.

Application October 22, 1946, Serial No. 704,929

4 Claims. (Cl. 29—69)

This invention relates to apparatus for cutting moving stock such as pipe, tubing, rods and the like into pieces of predetermined length while the stock is being progressively generated as in a continuous mill with the operation of which the cutting apparatus is coordinated and synchronized.

For example, in the manufacture of butt weld pipe in a continuous butt weld mill, the stock as it is produced is delivered in a continuous length and moves axially from the mill along a rectilinear path adjacent which is arranged cutting mechanism, generally known as a "flying saw," operative to sever the stock at spaced points and thus reduce it to individual lengths of pipe, the latter term being used herein generically to include any relatively rigid elongated material similarly moving along a horizontal path and adapted for severance into lengths by mechanism disposed adjacent such path, and so to comprehend rods and tubes as well as the class of goods specifically known as pipe.

Such cutting mechanism usually comprises a circular saw mounted on a table which is movable along ways parallel to the pipe path and is provided with means for translating the rotating saw laterally to project its edge across that path while the table and saw are moving forward parallel to and at approximately the speed of the pipe and for then retracting the saw from the pipe path after the cut is made and prior to return of the table to starting position, the table operating mechanism being connected to the mill drive in such way as to cause the table and saw to repeat their normal operating cycle at intervals so coordinated with the mill operation and resultant pipe production as to cut the pipe into uniform lengths. Necessarily the saw table and its associated elements must be fairly heavy to withstand the severe duty to which they are subjected, and it is apparent each cycle requires that the table carrying the saw proper, and usually its driving motor as well, be successively set in motion, brought to forward speed approximating that of the pipe, maintained substantially at that speed while the pipe is being cut and the saw retracted from the pipe path, then brought to rest at the limit of its forward travel and finally returned to starting position, all in a relatively brief period of time; for example about eight seconds when pipe generated at 300' per minute is being cut to 40' lengths.

Improvements in continuous pipe mills and in manufacturing procedure have progressively enhanced the speed at which pipe can be produced with, of course, corresponding lessening of the time available for completion of each operating cycle of the flying saw whereby greatly increased shocks and strains are imposed on most if not all its parts which result in increased repair and maintenance costs and shut-downs, in many cases tending in whole or in part to offset the advantages gained from the higher production rates.

It is therefore among the objects of the invention to provide means adapted for association and combination with a continuous mill and flying saw assembly adapted to assist in the actuation of the saw table, or even in some cases to supply substantially all the energy required for setting and maintaining it in motion, and which are operative as well to cushion the deceleration of the table toward the opposite limits of its travel and thereby substantially reduce or even eliminate the excessive shocks and strains to which the several parts of the mill and saw assembly would otherwise be subjected.

A further object is to provide fluid pressure responsive means for promoting or effecting acceleration and deceleration of a reciprocable saw table or the like including controls therefor coordinated in action with other mechanism whereby the table may be quickly and smoothly brought up to speed at the beginning of its travel in each direction and relatively gently cushioned toward the ends thereof thereby to eliminate or greatly minimize excessive shocks and strains even when high speeds are involved.

A still further object is to provide in combination with apparatus of the character described including a reciprocable saw table or the like pressure responsive means operative to augment mechanical acceleration of the table initiated by other means and independently to cushion deceleration from its high speed, thereby reducing repair and maintenance costs for the apparatus as a whole without correspondingly involving excessive costs of this character for said means themselves, thus rendering practicable the attainment of substantial increases in operating speed without sacrifice of operative effectiveness.

Other objects, advantages and novel features of design, construction and assembly comprehended by or incident to the invention are hereinafter mentioned or will be readily apparent to those familiar with the art to which it relates.

In the accompanying drawing to which reference may now be had, Fig. 1 is a fragmentary diagrammatic plan view of a portion of a continuous butt weld pipe mill and flying saw assembly of more or less conventional design with mechanism embodying the invention operatively incorporated therein;

Fig. 2 is a diagrammatic fragmentary side elevation of the saw table and table actuating mechanism;

Fig. 3 is a vertical section taken on the line 3—3 in Fig. 2, and Fig. 4 is a fragmentary one on line 4—4 in Fig. 1.

In the several figures like characters of reference are used to designate the same parts.

To facilitate a proper understanding of the invention I shall first refer to certain mechanical details of the cutting-off mechanism which it will be understood is to be considered as but typical of the several specific types thereof with which my invention may be associated; it is therefore shown and described herein for purposes of illustration only and not by way of limiting or restricting the scope of the present invention. Thus in Fig. 1 P designates the path of the pipe issuing from the delivery end of a continuous butt weld pipe or other mill of any suitable construction which may be driven by a motor (not shown) also driving a shaft 1 which through the medium of a worm gear reducer 2 and coupling 3 actuates the sliding saw table T when a positive-engagement clutch 4 is engaged to rotate a crank shaft 5 carrying a crank 6. A pitman 7 connected to crank 6 is arranged to impart oscillatory motion to a rocker arm 8 of which one end is pivoted to a fixed support 9 and the other end to a connecting rod 10, the remote end of the latter being connected to saw table T through the medium of a pin 11 and ears 12 projecting from the table base. This table carries the motor driven saw S, supported from one end of a transversely extending counterweighted walking beam 13, carried on bearings 14 and adapted to be oscillated in a vertical plane through engagement of a roller 15 on the beam with a cam 16 pivotally supported adjacent the table.

The table is adapted for reciprocatory movement parallel to the path P, being mounted on rollers 17 engaging rails 18, and when it moves to the left in Fig. 2 cam 16 operates the walking beam to cause the rotating saw to move transversely of said path while being translated parallel thereto at approximately the speed of the pipe. The cam is so shaped that after the saw edge has traversed said path and thereby severed the pipe, the saw is rapidly retracted during further forward travel of the table, the cam thereafter being swung out of the path of roller 15 during return travel of the table to prevent the saw edge again entering path P during that part of its cycle of operation. A cylinder 19 having its piston rod 20 connected by an arm 21 to the pivotally mounted cam-supporting plate 22 is conveniently used for moving the cam.

From the foregoing it will be apparent that crank 6 is instrumental, when clutch 4 is engaged, in effecting reciprocatory movement of the table, and it is therefore essential that means (not shown) be provided for causing the clutch to become engaged and disengaged in such timed relationship with the mill operation as to result in the saw severing the pipe at the proper distance from its leading end, and it will moreover be appreciated that the saw should be moving in the same direction as the pipe and at about the same speed while it is operating to sever the pipe, as otherwise the cutting-off operation is unsatisfactory.

It will be understood however, that the pipe severing apparatus I have thus far described is to be considered only as typical of various types of such apparatus in association and combination with which the present invention may be desirably employed and that any suitable means may be utilized for controlling the timing of the table and saw movements and that these parts may be of any construction adapted for the performance of their respective functions since they form no part of the present invention.

In accordance with the latter, however means are provided for imparting a vigorous impetus to the table at the initiation of its movement in either direction and also for cushioning or gently decelerating its motion as it is brought to a stop at either limit of its travel, said means being exemplified in a general way by a fluid cylinder 25, mounted for limited oscillation substantially in the plane of rocker arm 8 on trunnions 26, and a fluid responsive piston (not shown) reciprocable in this cylinder connected through a piston rod 27 to the rocker arm preferably adjacent the point at which connecting rod 10 is attached thereto.

With these elements are associated suitable controls, hereinafter more fully described, for admitting air under pressure, or other actuating fluid, into cylinder 25 at either end thereof and exhausting such fluid from the other end as the piston travels toward the latter as well as for metering the fluid exhaust, preferably during a part only of the piston travel in either direction, and as the control of admission and exhaust of the fluid is timed in relation to the operation of crank shaft 5 it is apparent it may readily be synchronized with that of the saw table. Preferably therefore the said controls are arranged and adjusted to provide for full fluid pressure in the cylinder at the right hand end in Fig. 2 at the initiation of movement of the crank shaft to thereby set the table rapidly in motion toward the left in said figure preparatory to severing the pipe; consequently when clutch 4 is engaged to move shaft 5 for this purpose, the fluid pressure in the cylinder operates through the piston and piston rod 27 to supply a vigorous additional surge of energy to rocker arm 8 to rapidly bring the table up to speed while imposing a relatively mild work load on shaft 5. At the beginning of this motion, and preferably for about two-thirds of the travel of the piston, the fluid in the left hand end of the cylinder is permitted to exhaust freely and the table therefore quickly reaches the speed of the pipe and thereafter travels at approximately that speed as cam 16 rocks walking beam 13 to move the saw transversely and sever pipe P'. Then, following retraction of the saw from path P, the table is brought to rest, and for the purpose of effecting its deceleration smoothly and gradually with minimum shock to any of the parts the exhaust of fluid from the left hand end of the cylinder is desirably materially restricted during the final third of the piston travel, being controlled so as to cause the piston to create a fairly substantial back pressure which, however, is relieved or "bled" from the cylinder at a rate corresponding to that required to bring about cushioned deceleration of the table in appropriately synchronized relation to the operation of shaft 5.

Upon the table coming to rest, that is after shaft 5 and crank 6 have traveled through 180° from starting position, the fluid controls are operated to admit full pressure to the left hand end of the cylinder in Fig. 2 and to allow the escape of fluid from the right hand end so that as crank 6 passes over center at the start of the return stroke the cylinder and piston operate in a manner similar to that just described, but in reverse direction, to impart initially a rapid acceleration to the table and then move it quickly back toward starting position with minimum strain or shock upon the several mechanical elements involved. Before roller 15 on beam 13 can reach cam 16 on the return stroke, however, cylinder 19 is operated to swing the cam out of the path of the roller, and the saw therefore does not approach path P on the return stroke but remains retracted therefrom until, on the next ensuing forward stroke, the cam having meanwhile been restored to the path of the roller by reverse operation of cylinder 19, it is again called upon to sever the pipe.

While any suitable means for controlling the flow of fluid into and from cylinder 25 in accordance with the foregoing may be utilized, I prefer to employ for this purpose and have diagrammatically indicated in the drawing, particularly Fig. 1, solenoid operated air valves mounted on the cylinder and cam switches operated by cams on shaft 5 for controlling the action of these valves. Thus at the right and left hand ends of cylinder 25 are disposed respectively two-way, two-position solenoid valves 32, 33 having leads 34, 35 connecting them electrically with cam switches 36, 37 operated by cams 39, 40 on shaft 5. Valves 32, 33 are also connected mechanically by fluid pipes 42, 43 with a four-way, two-position solenoid valve 44 on the cylinder having a flexible fluid connection 45 with a reservoir 46 and a pipe 47 connecting with a source of fluid under pressure (not shown), compressed air being the fluid usually most conveniently available and suitable for the purpose. Valve 44 is adapted to connect the fluid source selectively with either pipe 42, 43 and hence with valves 32, 33 and to afford concurrently a restricted exhaust for the fluid from whichever one of pipes 42, 43 is not thus connected therethrough, while valves 32, 33 operate either to connect the respective pipes 42, 43 with the interior of the cylinder adjacent its corresponding end or to obstruct these connections and open the cylinder ends to the atmosphere to permit free escape of fluid therefrom.

Valve 44 is operated similarly to valves 32, 33 through an electrical lead 48 from a cam switch 49 actuated by a cam 50 on shaft 5, while fluid under pressure for operating cylinder 19 to swing saw-operating cam 16 into and out of the path of roller 15 is controlled by another cam 51 on this same shaft operating a valve 52 for connecting the ends of the cylinder through pipes 53, 54 selectively with a fluid source (not shown) communicating with the valve through a pipe 55, or with the atmosphere.

The normal operating cycle of the apparatus herein shown and described, in accordance with what I now consider a preferred mode of its operation, may be deemed to begin with the parts in the several positions respectively shown in the drawing, with the saw table, shaft 5 and associated parts at rest, but with saw S rotating on its axis at normal speed and a pipe moving along path P from the mill, valves 32, 33 and 44 being so positioned that full air pressure is available at the right hand end of the cylinder while the left hand end is open to the atmosphere. With the mechanism in this condition, when the leading end of the pipe reaches a predetermined point along path P suitable devices (not shown) operate to engage clutch 4 to start rotation of shaft 5, thereby moving crank 6 from its dead center position (Fig. 2) to initiate forward movement of the saw table. The piston in cylinder 25, being thus simultaneously released, moves at once toward the left under the influence of the air pressure behind it as rapidly as is permitted by the rotational speed of shaft 5 and concurrent movement of the parts connected therewith including crank 6, pitman 7 and rocker arm 8. The combined action of the piston and shaft 5 is therefore effective to set the table rapidly in motion, a greater or less proportion of the energy required therefor being supplied by the piston depending principally on the air pressure acting upon it. Preferably at about the time shaft 5 is approaching a position 90° from starting position, corresponding substantially to maximum forward speed of the table which should be approximately that of the pipe, cam 16, by engagement with roller 15, rocks beam 13 to cause the saw edge to traverse the path P and sever the pipe, the beam counterweight or equivalent means quickly retracting the saw after the roller passes beyond the cam. Concurrently with retraction of the saw, or shortly thereafter, valves 32, 33 and 44 are operated to interrupt the flow of air to the right hand end of the cylinder 25 and relieve into the atmosphere the pressure therein behind the piston, while valve 33 is actuated to prevent further free escape of air from the left hand end of the cylinder, so that during the remainder of its forward travel the piston builds up in front of it an air cushion, which is gradually relieved by air bleeding from the cylinder through valve 33 and then to the atmosphere through the restricted port in valve 44, thus bringing the piston and hence the saw table gently to rest as shaft 5 completes its first 180° rotation from starting position. As the shaft then continues its rotation valves 33 and 44 again operate, this time to apply full air pressure to the left hand end of the cylinder, and the return of the table to initial position is thus effected in substantially the same manner as its forward motion but in reverse direction, except that before roller 15 reaches cam 16 on the return stroke the latter, by operation of cylinder 19, is moved out of the path of the roller and later restored thereto after the roller has passed the cam. As the table comes to rest at starting position with crank 6 again on dead center the pressure in the left hand end of the cylinder is relieved and full pressure made available at the right; the clutch control mechanism now usually causes the clutch to disengage, stopping shaft 5 and thus leaving the saw and table in readiness for initiation of a subsequent cycle preparatory to again cutting the pipe, although of course the speeds involved may be so coordinated with the pipe lengths to be cut that shaft 5 rotates continuously and the table cycles follow one another in quick succession without appreciable intervening periods of rest.

It will be evident from the foregoing that mechanism constructed in accordance with the invention is susceptible of adjustment over a wide range to meet different conditions, and that by suitably proportioning the various factors cylinder 25 with its piston may be made to contribute more or less to the table action as desired. Thus, as stated, I prefer to have it provide the primary motive force for the table, relegating the shaft and crank substantially to the functions of controlling the starting, stopping and intermediate speed of the table, and perhaps also limiting the extent of its travel, but without supplying any very substantial part of the energy required to start and/or move and/or stop it. However, by appropriate regulation of the fluid pressure supplied, of the rate of "bleeding" the back pressure which cushions deceleration and of the timing of the operation of the several controls, various effects may be obtained as will be apparent to those skilled in the art, and such and other changes and modifications in the form, construction, relationship and mode of operation of the several parts in the embodiment of the invention herein specifically described or in other embodiments thereof may be made if desired without departing from the spirit and scope of the invention as defined in the appended claims.

Having thus described my invention, I claim and desire to protect by Letters Patent of the United States:

1. In combination with a flying saw assembly adapted to cut continuously generated pipe into sections while the pipe is moving axially and comprising a saw-carrying table reciprocable parallel to the path of the pipe, a shaft adapted for rotation in timed relation to the movement of the pipe, means including a pivoted rocker arm interconnecting the shaft and table for moving the table longitudinally in correspondence to the rotation of the shaft, a fluid cylinder and a piston therein connected to the rocker arm, electrically actuated two-way valves having connections respectively with the opposite ends of the cylinder, an electrically actuated four-way valve having connection with a source of fluid under pressure, a fluid conduit connecting each two-way valve with the four-way valve, cam operated switches for said valves and cams carried by the shaft respectively adapted to operate said switches in timed relation with the rotation of the shaft whereby during the first 180° of each revolution fluid under pressure is admitted to one end of the cylinder and during the second 180° to the opposite end thereof.

2. In combination with a flying saw assembly adapted to cut continuously generated pipe into sections while the pipe is moving axially and comprising a saw-carrying table reciprocable parallel to the path of the pipe and a shaft adapted for rotation in timed relation to the movement of the pipe, means including a pivoted rocker arm and a pitman pivotally connected respectively to the shaft and arm eccentrically with respect to their axes and interconnecting the shaft and table, fluid pressure responsive means connected to the rocker arm, means for controlling the flow of fluid to and from said fluid pressure responsive means, and means actuated in synchronism with the shaft for operating said controlling means to energize said fluid pressure responsive means successively in opposite directions in timed relation with rotation of the shaft whereby said fluid pressure responsive means are effective to supply at least part of the force to accelerate the table as it is moved from the limits of its travel.

3. In combination with a flying saw assembly adapted to cut continuously generated pipe into sections while the pipe is moving axially and comprising a saw-carrying table reciprocable parallel to the path of the pipe, a shaft adapted for rotation in timed relation to the movement of the pipe and means adapted to continuously drive the shaft in one direction, means including a pivoted rocker arm and a pitman pivotally connected respectively to the shaft and arm eccentrically with respect to their axes and interconnecting the shaft and table adapted to mechanically reciprocate the table in correspondence to rotation of the shaft, a fluid cylinder and a piston therein connected to the rocker arm, means for alternately supplying fluid under pressure to and exhausting fluid from the opposite ends of the cylinder, and means actuated by the shaft for controlling said last mentioned means in such manner that during the first part of each shaft revolution fluid pressure is supplied in one of the cylinder to supplement the table accelerating power derived from the shaft and during a complementary part of the said shaft revolution is supplied in the opposite end to similarly supplement the shaft power for table acceleration in reverse direction.

4. In combination with a flying saw assembly adapted to cut continuously generated pipe into sections while the pipe is moving axially and comprising a saw-carrying table reciprocal parallel to the path of the pipe, a shaft adapted for rotation in timed relation to the movement of the pipe and means interconnecting the shaft and table, fluid pressure responsive means connected to said interconnecting means, means controlling the flow of fluid to and from said fluid pressure responsive means, and means actuated in synchronism with the shaft operative through said controlling means to bring about successive energization of said fluid pressure responsive means in opposite directions in timed relation with rotation of the shaft whereby to cause said last mentioned means to supply at least part of the force to accelerate the table as it is moved from either limit of its travel.

CHARLES E. HOMER.

REFERENCES CITED

The following references are of record in the file of this patent:

UNITED STATES PATENTS

| Number | Name | Date |
|---|---|---|
| 478,573 | Crowell | July 12, 1892 |
| 1,174,014 | Bardet | Mar. 7, 1916 |
| 1,989,331 | Morgan | Jan. 29, 1935 |
| 2,133,542 | Jensen | Oct. 18, 1938 |
| 2,278,786 | Johnston | Apr. 7, 1942 |
| 2,340,870 | Edwards et al. | Feb. 8, 1944 |
| 2,350,975 | Rodder et al. | June 6, 1944 |
| 2,371,553 | Scott | Mar. 13, 1945 |